Dec. 3, 1940.  J. A. ZUBLIN  2,223,864

ROLLER CUTTER

Filed March 13, 1939

Inventor

JOHN A. ZUBLIN,

By Bernard Kriegel

Attorney

Patented Dec. 3, 1940

2,223,864

UNITED STATES PATENT OFFICE 2,223,864

ROLLER CUTTER

John A. Zublin, Los Angeles, Calif.

Application March 13, 1939, Serial No. 261,570

3 Claims. (Cl. 255—71)

This invention relates to cutters, and particularly to those types of cutters employed in the drilling of bore holes, such as wells.

Various kinds of cutters are used in the drilling of wells, among them being toothed star cutters and disc cutters. It is usual to increase their wear resisting properties by applying a hardfacing to their cutting surfaces. The application of this hardfacing by welding it uniformly to the body metal causes distortion and hair line cracks due to the strains produced upon cooling of the weld. These cracks oftentimes extend into the body metal, being a source of cutter failure due to fatigue and other strains encountered during the drilling operation. In the smaller cutter sizes, a uniform layer of hardfacing applied to the cutter faces tends to separate because of the relative thinness of the layer and the lack of an adequate bond with the body metal of the cutter. This separation is increased by the force of the formation on the ends of the cutters, causing the hardfacing to spall off.

When disc cutters are employed, they usually are provided with a smooth, sharp initial edge of sufficiently decreased cross-sectional area to cause its penetration into the formation and effect a gearing of the cutter to the bottom and side walls of the hole, assuring rotation of the cutter with respect to a body on which it is rotatably mounted. Hardfacing materials have heretofore been applied uniformly over the face of the disc cutting edge, resulting in a correspondingly smooth peripheral edge. Since the disc is tapered, wear on the edge will produce its blunting and a lessened penetration, or lack of penetration, into the formation. As a consequence, a gearing effect is no longer present between the disc and the side walls and hole bottom, permitting the disc to slide on the formation whenever the friction of its bearing mounting is greater than the reactive force between the blunt disc cutting edge and the formation. The life of the cutter is accordingly decreased, since its inability to rotate will eventually result in its flattening, caused by its sliding upon the bottom of the hole and its side walls.

It is also noted that in the smaller sizes of cutters, only a thin, uniform layer of hardfacing can be applied, which necessarily means that only a small, limited quantity can be placed on the cutter. This is governed by the need for a thin cutter tooth or disc, whose dimensions are determined and limited by the necessity for penetrating the formation. The incorporation of a large quantity of hardfacing in the cutter would increase its effective life materially, provided that the proper bond could be produced between the hardfacing and the body metal of the cutter.

Accordingly, it becomes an object of this invention to provide a cutter including a hardfacing so placed and distributed on its cutting portions as to prevent or diminish spalling off of the hardfacing.

It is a further object of the invention to provide a disc cutter capable of gearing itself to the formation after its edge becomes blunt.

Another object of the invention is concerned with a cutter having a cutter edge and surface provided with a facing of spaced, wear-resisting material partially embraced by the cutter body metal of lower wear-resisting properties.

Still a further object of the invention is to provide a cutter having spaced, wear-resisting material in staggered relationship on both sides of the cutter.

A further object of the invention involves a method of attaching a wear-resisting material in granular form to a cutter by melting the cutter body metal to produce spaced grooves in which the wear-resisting material is confined.

Other objects and advantages of my invention will become readily apparent from a consideration of the following description and the embodiments of the invention shown in the drawing forming part of this specification.

In its general aspects, the invention contemplates the application of a hardfacing, such as tungsten carbide, in separated sections to the cutters of well drilling bits, producing a product having an initially smooth edge of sufficient thinness to penetrate the formation. The intermittent application of the hardfacing increases the quantity that can be placed on cutters having thin discs or teeth; and also prevents the separation or spalling off of the hardfacing under loading of the cutter.

Figure 1:
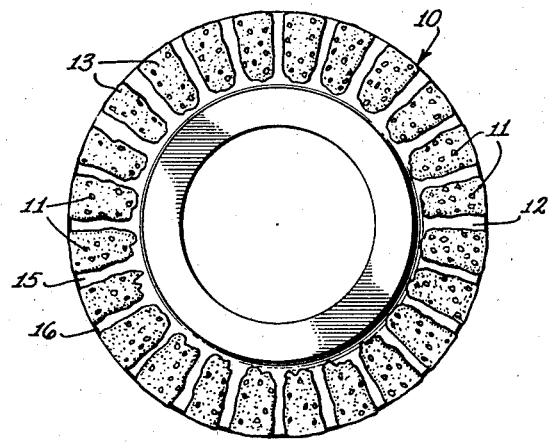
Figure 1 is a plan view of a disc cutter with hardfacing applied thereto in accordance with my invention.
Figure 2:
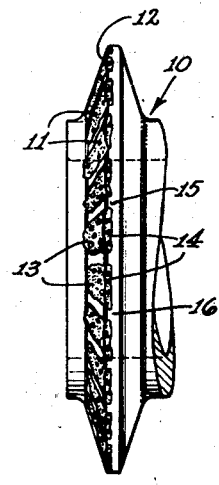
Figure 2 is a side elevation of the disc cutter shown in Figure 1.

The cutter disclosed in Figures 1 and 2 includes a disc 10 tapering outwardly toward its circumferential edge, and having tungsten carbide granules 11, or an equivalent material, welded into a side face 12 of the disc in spaced segmental sections 13, each of which is embedded in a groove 14 produced in the body of the cutter, and each section preferably extending outwardly from the face. Thus, the hardfacing of tungsten carbide is partially surrounded by the body metal 15 of the cutter, to which it is firmly held.

It is unnecessary to pre-form the grooves 14 in order to embed the tungsten carbide therein. A welding flame, which can be an oxy-acetylene or atomic hydrogen arc, is played generally radially of the cutter face 12 and will melt the body metal to form a pool. Thereafter, the tungsten carbide granules (of from about 6 to 60 mesh), contained preferably in a tubular or similar welding rod, are placed in the flame, the tube being melted or burned away and the granules of tungsten carbide allowed to settle into the pool to displace the body metal, due to the greater density of the tungsten carbide; and in this manner producing the grooves 14 in the face of the cutter.

Due to the substantial surrounding of each hardfacing segment 13 by the body metal 15, the tendency for separation is correspondingly resisted. The embedding of the segments in the body and the ability of the tungsten carbide to extend and be effectively supported above the cutter face results in the ability to deposit a much greater percentage of hardfacing than if it were uniformly applied over the entire face 12.

While the initial cutting edge 16 of the disc can be smooth and produce effective penetration into the formation, the wearing down or blunting of this edge does not impede the ability of the cutter to remove the formation. The intermittent application of the hardfacing provides softer body metal 15 between the segments 13 of tungsten carbide. This softer body metal will be worn away radially below the hardfacing, forming protuberances of tungsten carbide and a slightly toothed or roughened cutting edge. This hardfacing material is still effective in penetrating the formation and producing its removal. It also insures rotation of the cutter since the serrated or roughened intermittent protuberances of tungsten carbide can effect the necessary gearing action with the formation and overcome whatever bearing friction develops between the cutter and its mounting.

Figure 3:
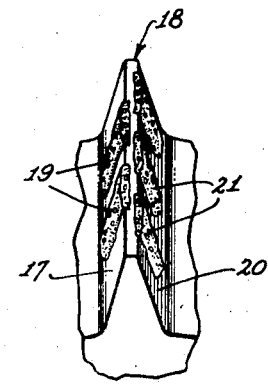
Figure 3 is a perspective view of a cutter tooth with the hardfacing applied thereto in accordance with the present invention.

The invention is shown applied to the tooth of a cutter in Figure 3. By an operation similar to the one described in connection with Figures 1 and 2, one face 17 of the tooth 18 is provided with separated, welded in segments 19 of tungsten carbide. The other face 20 of the tooth can have similar segments 21 welded into it, preferably in staggered relationship with respect to the first mentioned segments 19. This arrangement affords a much greater deposit of hardfacing on each tooth, while allowing sufficient body metal to support the hardfacing effectively on the tooth. Attempts at applying tungsten carbide uniformly over both tooth faces would result in too brittle a structure and its early failure.

Figure 4:
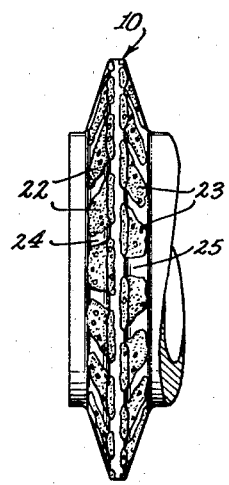
Figure 4 is a side elevation of a modified form of disc cutter.

If deemed expedient, a staggered arrangement of intermittent hardfacing deposits 22, 23 can be used upon both faces 24, 25 of a disc, as illustrated in Figure 4.

It is to be understood that the disclosed embodiments are merely illustrative of the invention, and are not restrictive thereon, since the invention is best defined in the claims appended hereto.

I claim:

1. A cutter for well drilling bits including a cutting element having a plurality of faces, spaced deposits of a hard, wear-resistant material in one of said faces, and deposits of a hard, wear-resistant material in another of said faces in staggered relationship with respect to said first-mentioned deposits.

2. A cutter tooth having intermittent deposits of a hard, wear-resistant material on one face, and intermittent deposits of hard, wear-resistant material on an opposite face in staggered relationship with respect to said first-named deposits.

3. A cutter for well drilling bits including a disc cutting element having opposed faces, spaced deposits of a hard, wear-resistant material in one of said faces, and deposits of a hard, wear-resistant material in the other of said faces in staggered relationship with respect to said first-mentioned deposits.

JOHN A. ZUBLIN.